Oct. 10, 1933.  S. G. SKINNER  1,929,611
VARIABLE SPEED DRIVE
Filed Nov. 25, 1932    2 Sheets-Sheet 1
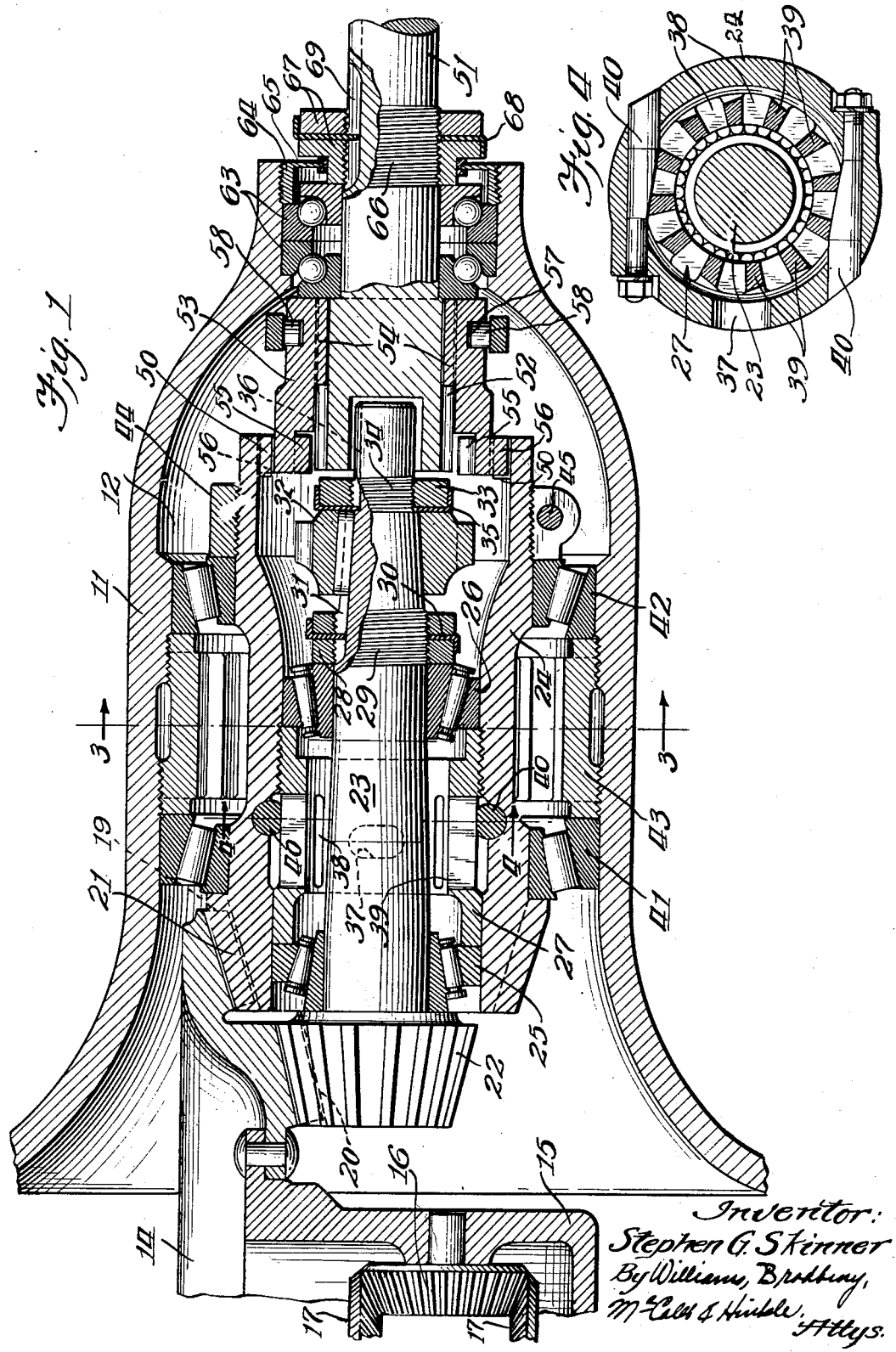
Inventor:
Stephen G. Skinner
By Williams, Bradbury,
McCaleb & Hinkle, Attys.

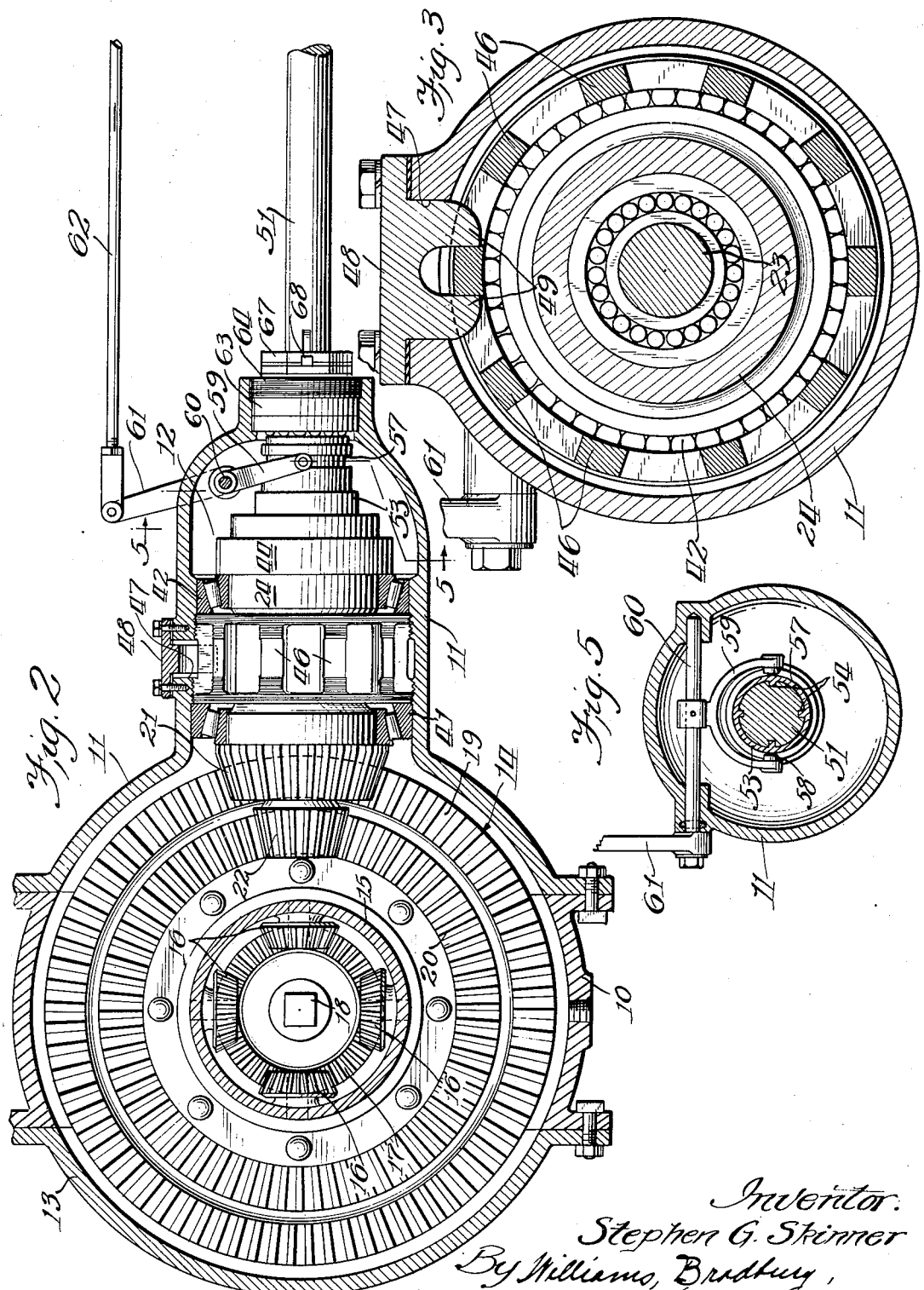

Patented Oct. 10, 1933

1,929,611

UNITED STATES PATENT OFFICE 1,929,611

VARIABLE SPEED DRIVE

Stephen G. Skinner, Los Angeles, Calif.

Application November 25, 1932
Serial No. 644,165

3 Claims. (Cl. 74—59)

This invention relates to variable speed drives.

One of the objects of the invention is to provide an improved variable speed drive.

A further object of the invention is to provide an improved variable speed drive which is particularly suitable for transmitting power at an angle.

A further object of the invention is to provide an improved variable speed drive in which the drive is direct for a plurality of speed ratios.

A further object of the invention is to provide a variable speed drive which is particularly suitable for automotive vehicles.

A further object of the invention is to provide an improved variable speed drive which is particularly adapted for use in automotive vehicles to supplement the conventional transmission so as to provide a greater number of speed ratios.

Other objects, advantages, and capabilities of the invention will appear from the following description of a preferred embodiment thereof, taken in conjunction with the accompanying drawings, in which Figure 1 is a sectional plan of the variable speed drive mechanism associated with the differential drive of an automotive vehicle;

Fig. 2 is a vertical section, on a smaller scale, through the differential housing and the housing of the variable speed drive mechanism, which mechanism is shown in elevation;

Fig. 3 is a sectional detail taken on the line 3—3 of Fig. 1;

Fig. 4 is a sectional detail taken on the line 4—4 of Fig. 1, and

Fig. 5 is a sectional detail taken on the line 5—5 of Fig. 2.

Referring to the drawings, the reference numeral 10 designates the rear axle housing of an automotive vehicle, which is bellied out in its center to provide the central portion of the differential housing. On the forward side is secured a housing 11 which receives the forwardly extending part of the differential mechanism and provides a chamber 12 for the reception of the variable speed drive mechanism hereinafter described in detail. The rear side of the axle housing 10 is closed by a convex plate 13 which accommodates the rearwardly projecting portions of the differential mechanism.

The differential comprises a ring gear 14 which is rigidly secured to a housing 15. The housing 15 carries bevel gears 16 mounted on radial axes, which bevel gears cooperate with bevel gears 17 which are non-rotatably secured to axles 18. The complete differential, with the exception of the ring gear 14, may be of standard construction and need not be further described. The ring gear 14 comprises a plurality of tracks of beveled teeth designated 19 and 20, there being two tracks of teeth in the embodiment illustrated in the drawings. It will, however, be understood that the invention is not intended to be limited to two tracks, since a greater number may be employed if desired. The tracks 19 and 20 mesh with bevel gears 21 and 22 respectively, which are carried by the variable speed drive mechanism which will now be described.

The variable speed drive mechanism is preferably constructed in the form of a unit which may be inserted into the chamber 12 in assembled condition. This unit comprises a central shaft 23 on which the bevel gear 22 is mounted. This shaft 23 is rotatably mounted within a sleeve 24, the end of which is adjacent the gear 22 carrying the bevel gear 21. Roller bearings 25 and 26 provide a low friction mounting for the shaft 23 upon the sleeve 24. The bearings 25 and 26 are spaced apart by a spacing sleeve 27 which is preferably substantially spool-like, being waisted about its center. The forward end of the spacing sleeve 27 is threaded and is adapted to engage a correspondingly threaded portion of the sleeve 24 so that the shaft 23 may be adjusted axially with respect to the sleeve 24.

The initial step in the assembly of the variable speed drive mechanism consists in applying the bearing 25 on the shaft 23. The spacing sleeve 27 is then applied so as to abut against the bearing 25 and the bearing 26 is applied in abutment with the spacing sleeve 27. Locking nuts 28 are then threaded on to the threaded portion 29 of the shaft 23, being adjusted to the satisfactory tightness of the bearings 25 and 26. The locking nuts 28 are held against rotation by means of an intermediate washer 30 which has tongues bent over to engage the faces of the nuts in known manner. The washer 30 has a portion which fits into a keyway 31 cut in the adjacent portion of the shaft 23.

Forwardly of the locking nuts 28 a clutch member 32 is keyed upon the shaft 23, being held against forward displacement by means of a nut 33, mounted on a threaded portion 34 of the shaft 23. The nut 33 is held against rotation by means of a washer 35 which has projecting tongues which are bent over the faces of the nut 33 after the same is tightened. The washer 35 has a portion which projects into a keyway 36, which keyway extends to the forward end of the shaft 23.

In order to enable the sleeve 27 to be rotated into its operative position within the sleeve 24, the latter sleeve is provided with an opening 37 through which a tool may be introduced to rotate the sleeve 27. The intermediate waisted portion of the sleeve 27 is provided with a series of longitudinal slots 38 leaving between them a series of longitudinal ribs 39 which can be engaged by a tool entered through the pinion 37 into the slots 38, as will be best understood from the section in Fig. 4. In this way the sleeve 27 may be accurately adjusted within the sleeve 24 so that the two pinions 21 and 22 are located in correct relative position, as is necessary in order to attain perfect meshing with the teeth tracks of the ring gear 14.

In the form shown in Fig. 4 there are twelve ribs 39 and their outer surfaces are cut obliquely so as to establish six flat faces analogous to the faces of a hexagonal nut, that is the outer faces of adjacent pairs of ribs 39 are continuations of each other, as best seen in Fig. 4. In order to secure the sleeve 27 in fixed position relative to the sleeve 24, bolts 40 extend in chord-like relation through the wall of the sleeve 24. These bolts 40 have flat surfaces which are adapted to engage a pair of surfaces of ribs 39. By tightening the nuts on these bolts the same may be drawn so as to bring their surfaces into firm contact with the surfaces of the ribs 39, so that relative rotation between the sleeves 24 and 27 is absolutely prevented.

The sleeve 24 is now provided with bearings 41 and 42 with an intermediate spacing sleeve 43, in similar manner to the mounting of the bearings 25 and 26 and sleeve 27. In order to conduct this assembly, the bearing 41 is passed from the forward end of the sleeve 24 rearwardly until it contacts with the suitable shoulder adjacent the pinion 21. The sleeve 43 is then slipped over the sleeve 24 in the same manner, the bearing 42 is applied and finally a lock ring 44 is threaded on to a threaded portion at the forward end of the sleeve 24 until the desired tightness in the bearings 41 and 42 is attained. The ring 44 may suitably be a split ring which is tightened for desired adjustment by means of a bolt 45.

The sleeve 43 is closely analogous to the sleeve 27, that is, it is of general spool-like form being waisted in the center and provided with ribs 46 whereby the sleeve 43 may be rotated by a suitable tool introduced through an opening 47. The ends of the sleeve 43 are of different diameters, the forward end being smaller than the rear end. The ends of the sleeve 43 are externally threaded so as to engage correspondingly threaded portions of the housing 11. It will readily be understood that the whole assembly, including the shaft 23, sleeve 24, bearings 41 and 42 and sleeve 43, is inserted as a unit from the rear into the housing 11 until the threaded portions of the spacing sleeve 43 are brought into contact with the corresponding threaded portions of the housing 11. Thereafter the sleeve 43 is rotated by means of a tool inserted through the opening 47 until the desired location of the mechanism is attained. When the desired position is arrived at, the sleeve 43 is locked against movement in any suitable manner. This may be done by means of a cap 48 which is used to close the opening 47. This cap has downwardly projecting elements 49 which are adapted to engage one of the ribs 46 of the sleeve 43.

The sleeve 24 is provided, at its forward end, with internal clutch teeth 50 which are located somewhat forwardly of the clutch member 32. A propeller shaft 51, from which power is derived, extends into the chamber 12 through the forward end of the housing 11. The rearward end of the shaft 51 is enlarged and is provided with keyways 52 upon which is mounted a sliding clutch member 53 having inwardly projecting ribs 54 by means of which it rides freely upon the enlarged rear end of the propeller shaft 51. The clutch member 53 is provided at its rear end with inwardly directed clutch teeth 55 and outwardly directed teeth 56 which are adapted to engage the clutch teeth of the clutch member 32 or the clutch 50 of the sleeve 24.

The clutch member 53 is provided with a circumferential groove 57 into which extend pins 58 carried by the arms of a fork 59. The fork 59 is rigidly secured to a shaft 60 which has bearings in the housing 11 and projects therebeyond. The projecting end of the shaft 60 has rigidly secured thereto an arm 61 which is pivotally connected to a rod 62 which may, in turn, be connected to a hand lever or other suitable means for actuating the clutch member 53 at will.

With reference to Fig. 1, it will be noted that the clutch member 53 is shown in mesh with the teeth of the sleeve 24 so that the sleeve 24 is directly driven from the shaft 51. When the clutch member 53 is moved rearwardly so that its clutch teeth 55 engage the teeth of the clutch member 32, rigidly mounted on the shaft 23, the pinion 22 is directly driven by the shaft 51. In both cases the drive is direct, the clutch member 53 serving purely as a clutching means for securing the shaft 51 directly to either the sleeve 24 or the shaft 23. As will best be seen in Fig. 1, the shaft 51 can be inserted from the front, likewise double thrust bearings 63 which are secured in position by means of a threaded ring 64, mounted in the forward end of the housing 11. The ring 64 carries an inwardly directed flange 65. Adjacent the forward end of the housing 11, the shaft 51 has a threaded portion 66 upon which are mounted a pair of lock nuts 67, which bear against the outermost of the bearings 63. The lock nuts 67 are locked by means of a washer 68 having exterior tongues bent over the flat surfaces of the nut 67. The washer 68 has a portion which extends into a keyway 69 in the shaft 51. It will be understood that the shaft 51, together with the bearings, are mounted in position before the variable speed drive mechanism is inserted. The clutch member 53 is then applied from the rear upon the enlarged end of the shaft 51, the fork 59 being manipulated so as to bring its pins 58 into the groove 57. The variable speed drive mechanism is then inserted in the manner described above.

It will readily be understood that the drive of the propeller shaft 51 will be communicated at different speeds to the ring gear 14, depending upon whether the drive is transmitted by the shaft 23 or the sleeve 24. The relative speeds attained by the ring gear 14 depend upon the effective ratios of the gear 21 and track of teeth 19 on the one hand, and the gear 22 and track of teeth 20 on the other hand. It will be understood that these ratios may be varied at will in order to obtain any desired gear ratios.

It will also be understood that while I have shown one driving shaft 23 within one driving sleeve 24, I do not intend to be limited thereto since the multiple speed drive herein described is readily adapted for use with a greater number of driving elements, in the form of sleeves one within the other.

Although the invention has been described in connection with the specific details of a preferred embodiment thereof, it must be understood that such details are not intended to be limitative of the invention except in so far as set forth in the accompanying claims.

Having thus described my invention, what I claim as new and desire to secure by Letters Patent of the United States is:

1. In combination an automotive axle housing, a ring gear therein, an extension housing extending forwardly from said axle housing, a propeller shaft entering said extension housing, a variable speed mechanism in said extension housing, said mechanism comprising a pair of driving members, one located within the other and provided with beveled gears in mesh with said ring gear, said mechanism being assembled within a sleeve to form a unit for insertion within said extension housing and a clutch in said extension housing operable to connect the propeller shaft directly to either of said driving elements, said gears being adapted to provide different speed ratios.

2. In combination, a variable speed mechanism comprising a shaft and a sleeve, bevel gears carried by the shaft and sleeve at adjacent ends, bearings for the shaft within the sleeve, a spacer sleeve adjustably movable and adapted to be locked to the first said sleeve to adjust the relative position of the bevel gears and maintain the desired adjustment, bearings for the first said sleeve, a spacer sleeve mounted thereon, a housing for the mechanism, means for adjusting the last said spacer sleeve in the housing, and means for locking the last said spacer sleeve in the housing.

3. In combination, a variable speed mechanism comprising a shaft and a sleeve, bevel gears carried by the shaft and sleeve at adjacent ends, bearings for the shaft within the sleeve, a spacer sleeve adjustably movable and adapted to be locked to the first said sleeve to adjust the relative position of the bevel gears and maintain the desired adjustment, bearings for the first said sleeve, a spacer sleeve mounted thereon, a housing for the mechanism, means for adjusting the last said spacer sleeve in the housing, means for locking the last said spacer sleeve in the housing, a propeller shaft, and operable means for clutching the propeller shaft to either the shaft or the first said sleeve.

STEPHEN G. SKINNER.